(12) United States Patent
Canales et al.

(10) Patent No.: US 10,374,431 B2
(45) Date of Patent: Aug. 6, 2019

(54) POWER CONVERTER SYSTEM FOR RENEWABLE ENERGY SOURCES

(71) Applicant: ABB Schweiz AG, Baden (CH)

(72) Inventors: Francisco Canales, Baden-Dättwil (CH); Frederick Kieferndorf, Baden (CH); Drazen Dujic, Paudex (CH)

(73) Assignee: ABB Schweiz AG, Baden (CH)

( * ) Notice: Subject to any disclaimer, the term of this patent is extended or adjusted under 35 U.S.C. 154(b) by 184 days.

(21) Appl. No.: 15/407,925

(22) Filed: Jan. 17, 2017

(65) Prior Publication Data

US 2017/0126010 A1 May 4, 2017

Related U.S. Application Data

(63) Continuation of application No. PCT/EP2015/066425, filed on Jul. 17, 2015.

(30) Foreign Application Priority Data

Jul. 17, 2014 (EP) ..................................... 14177354

(51) Int. Cl.
*H02J 3/38* (2006.01)
*H02J 1/10* (2006.01)
(Continued)

(52) U.S. Cl.
CPC .............. *H02J 3/382* (2013.01); *H02J 1/102* (2013.01); *H02J 3/383* (2013.01); *H02J 3/386* (2013.01);
(Continued)

(58) Field of Classification Search
CPC .. H02J 1/102; H02J 3/382; H02J 3/383; H02J 3/386; H02M 3/158; H02M 3/28;
(Continued)

(56) References Cited

U.S. PATENT DOCUMENTS

2005/0094330 A1 5/2005 Guenther et al.
2009/0284078 A1 11/2009 Zhang et al.
(Continued)

FOREIGN PATENT DOCUMENTS

CN 102801177 A 11/2012
CN 103378761 A 10/2013
(Continued)

OTHER PUBLICATIONS

European Patent Office, International Search Report & Written Opinion issued in corresponding Application No. PCT/EP2015/066425, dated Oct. 1, 2015, 10 pages.
(Continued)

*Primary Examiner* — Hal Kaplan
(74) *Attorney, Agent, or Firm* — Taft Stettinius & Hollister LLP; J. Bruce Schelkopf

(57) ABSTRACT

A converter system for interconnecting renewable energy sources with a DC distribution bus comprises a converter unit which comprises an isolated DC-to-DC converter connectable to the renewable energy source, and a non-isolated DC-to-DC converter connectable to the DC distribution bus, which is cascade connected with the isolated DC-to-DC converter.

19 Claims, 4 Drawing Sheets

(51) Int. Cl.
*H02M 3/28* (2006.01)
*H02M 3/158* (2006.01)
*H02M 3/335* (2006.01)

(52) U.S. Cl.
CPC .............. *H02M 3/158* (2013.01); *H02M 3/28* (2013.01); *H02M 3/285* (2013.01); *H02M 3/33507* (2013.01); *H02M 3/33592* (2013.01); *Y02B 70/1475* (2013.01); *Y02E 10/763* (2013.01)

(58) Field of Classification Search
CPC .............. H02M 3/285; H02M 3/33507; H02M 3/33592; Y02B 70/1475; Y02E 10/763
USPC ......................................................... 307/82
See application file for complete search history.

(56) References Cited

U.S. PATENT DOCUMENTS

| | | |
|---|---|---|
| 2010/0156189 A1 | 6/2010 | Fishman |
| 2011/0199044 A1 | 8/2011 | Kimball et al. |
| 2012/0025535 A1 | 2/2012 | Sihler et al. |
| 2012/0080955 A1 | 4/2012 | Fishman et al. |
| 2013/0197704 A1* | 8/2013 | Pan ........................ H02J 3/36 700/287 |

FOREIGN PATENT DOCUMENTS

| | | |
|---|---|---|
| CN | 103607032 A | 2/2014 |
| CN | 104137376 A | 11/2014 |
| EP | 2341594 A1 | 7/2011 |
| JP | 2010213466 A | 9/2010 |
| JP | 2011522313 A | 7/2011 |
| JP | 2014516237 A | 7/2014 |
| WO | 2011029566 A1 | 3/2011 |
| WO | 2011083418 A1 | 7/2011 |

OTHER PUBLICATIONS

M. P. Bahrman and B. K. Johnson, "The ABCs of HVDC Transmission Technologies: An Overview of High Voltage Direct Current Systems and Applications," in IEEE Power & Energy Magazine, vol. 5, No. 2, pp. 32-44, Mar./Apr. 2007.

N. Flourentzou, G. D. Demetriades and V. G. Agelidis, "VSC-Based HVDC Power Transmission Systems: An overview," in IEEE Transactions on Power Electronics, vol. 24, No. 3, pp. 592-602, Mar. 2009.

P. Bresesti, W. Kling, R. Hendriks, and R. Vailati, "HVDC Connection of Offshore Wind Farms to the Transmission System," in IEEE Transactions on Energy Conversion, vol. 22, No. 1, pp. 37-43, Mar. 2007.

M. Eichler, "Offshore but Online: PCS6000 Wind Converter for 5 MW Offshore Wind Turbines," ABB Review Mar. 2008, pp. 56-61.

W. Chen, A. Huang, S. Lukic, J. Svensson, J. Li, and Z. Wang, "A Comparison of Medium Voltage High Power DC/DC Converters with High Step-Up Conversion Ratio for Offshore Wind Energy Systems," in IEEE ECCE 2011, pp. 584-589.

Q. Wang and L. Chang, "An Intelligent Maximum Power Extraction Algorithm for Inverter-Based Variable Speed Wind Turbine Systems," in IEEE Transactions on Power Electronics, vol. 19, No. 5, pp. 1242-1249, Sep. 2004.

X. Yuan, F. Wang, R. Burgos, Y. Li and D. Boroyevich, "DC-Link Voltage Control of Full Power Conversion for Wind Generator Operating in Weak Grid Systems," in PESC 2008, pp. 761-767.

Bunlung Neammanee, Somporn Sirisumrannukul and Somchai Chatratana, Chapter 9 in "Wind Power," ISBN 978-953-7619-81-7, Published: Jun. 1, 2010.

* cited by examiner

POWER CONVERTER SYSTEM FOR RENEWABLE ENERGY SOURCES

FIELD OF THE INVENTION

The invention relates to the field of electrical power conversion, in particular with respect to renewable energy sources. Specifically, the invention relates to a converter system, a superior converter system, a renewable energy power station, as well as to a method and a controller for operating the converter system and superior converter system.

BACKGROUND OF THE INVENTION

In a wind farm as renewable energy power station, the wind power generators as renewable energy sources are connected in several stages to a high voltage DC distribution grid. In a first, medium voltage level stage, each renewable energy source may be connected via an indirect AC-to-AC converter to a distribution bus. The wind generator is usually driven in a variable speed operation mode, which allows a higher energy output, lower mechanical stress and less power fluctuation when compared to a system operating with constant speed. In a second, high voltage stage, one or more of the distribution buses are connected via an AC-to-DC converter with the high voltage DC distribution grid.

The main functionalities of a converter interconnecting a wind power generator with the distribution bus are the regulation of the output of the wind power generator and at the same time the energy conversion from variable frequency and voltage to constant frequency and constant voltage.

Usually the first converter comprises an energy source side AC-to-DC converter interconnected via a DC link with a bus side DC-to-AC converter. The control strategies for these converters may differ according to the application. For example, in strong grid applications, where the contribution of the wind energy into the distribution bus is small compared to the total installed power, the bus side converter is used primarily to regulate the DC link voltage to the optimal level for the energy source side rectifier. At the same time, the current injected into the distribution bus has to meet standards related to harmonic distortion and power quality. For example, a three-level converter may be used to perform such a task. The energy source side AC-to-DC converter regulates the speed of the wind power generator (for example a PMG) to achieve the desired power transfer for the given wind conditions. In addition, the AC-to-DC converter can achieve the optimal operating point for the system, considering that at a given wind speed, the maximum turbine energy conversion efficiency occurs at an optimal ratio of the turbine rotor tip speed to the wind speed. This means that as the wind speed changes, the rotor speed of the turbine must change accordingly to maintain the optimal turbine energy conversion ratio.

On the other hand, in applications where the contribution of the wind energy is a significant portion of the installed power and the energy is fed to a weak grid, the functionalities of the converters differ. In this case, the main goal of the bus side converter is to regulate the frequency and voltage of the distribution bus. The DC link voltage is controlled by the energy source side converter.

Between the AC-to-AC converter interconnecting a renewable energy source and the distribution grid, a low frequency transformer may be used for stepping up the voltage. Another transformer may be used to increase the medium AC voltage in the distribution bus to a high voltage to be input into the AC-to-DC converter before the high voltage DC distribution grid, which rectifies the AC voltage and controls the DC voltage to be input into the high voltage DC distribution grid.

Such a converter system may present disadvantages such as the need for several conversion stages which results in lower efficiency, higher costs and difficulty to comply with grid code standards. The use of low frequency transformers may be another disadvantage, since it penalizes weight, size and power density (which may be some of the key parameters in offshore applications).

Alternatively, the AC distribution bus may be replaced with a medium voltage DC distribution bus. In this DC approach, the resulting AC voltage from the wind power generator is rectified and stepped up to the DC medium voltage. Several such converter units may be interconnected to one DC distribution bus. Another DC-to-DC converter may then be used for the connection to the high voltage DC distribution grid. The main benefit of such an approach may be the simplification in the connection of several converter units to the DC distribution bus and the advantage of connecting a medium voltage DC distribution bus to a high voltage DC distribution grid. However, this approach still presents some drawbacks such as the need for fast circuit breakers and current limiters which protect the converter units connected to the wind power generators under short circuit and over current conditions. Furthermore, the DC-to-DC converter usually also comprises several cascaded isolated DC-to-DC converter stages.

For example, EP 2 341 594 A1 describes a power collection and transmission system, which uses isolated DC-to-DC converters for connecting wind power generators with a high voltage distribution grid in two isolated stages.

WO 2011/029566 A1 shows a further example for a two stage system with intermediate DC distribution bus for supplying electrical loads.

U.S. 2010/0156189 A1 relates to collection of electric power from renewable energy sources and shows a further example how isolated DC-to-DC converters may be used for connecting wind power generators to a distribution grid.

DESCRIPTION OF THE INVENTION

It is an objective of the invention to reduce costs of a renewable energy power station, to enhance the efficiency of such a power station and to optimize control of the converters of such a power station.

This objective is achieved by the subject-matter of the independent claims. Further exemplary embodiments are evident from the dependent claims and the following description.

A first aspect of the invention relates to a converter system for interconnecting renewable energy sources with a DC distribution bus being at least at medium voltage level. The renewable energy sources may generate an AC output voltage (for example wind power generators) or a DC output voltage (for example photovoltaic modules), which output voltage may be converted into a DC voltage that is fed into a DC distribution bus. The DC distribution bus may be an internal part of a power station the converter system belongs to and/or may be directly interconnected with a DC distribution grid. It is also possible that the DC distribution bus and the large scale DC distribution grid are indirectly interconnected by further DC-to-DC converters. The term "medium voltage" refers above and in the following to voltages above low voltage. In accordance with the IEEE- 141 standard the term low voltage is used in this application to designate voltages below 600 V. Medium voltage thus refers to voltages above 600 V, for example to voltages of 650 V, 700V or above. Medium voltage, as used in this application, does included voltages up to 50 kV.

The term "converter system for interconnecting renewable energy sources with a DC distribution bus being at least at medium voltage level" refers above and in the following to a converter system, which converter system is capable of interconnecting a renewable energy source to a medium voltage DC distribution bus. A "converter system for interconnecting renewable energy sources with a DC distribution bus being at least at medium voltage" does neither imply the presence of a DC distribution bus nor does it specify a voltage level of any present DC distribution bus. It is a functional characteristic of the converter unit. It defines its capability to connect a renewable power source to a DC distribution bus at medium voltage level or any bus at voltage level higher than medium voltage, e.g. a DC distribution bus at high voltage level.

According to an embodiment of the invention, the converter system comprises a converter unit for interconnecting a renewable energy source with the DC distribution bus, wherein the converter unit comprises an isolated DC-to-DC converter connectable to the renewable energy source, and a non-isolated DC-to-DC converter connectable to the DC distribution bus, which is cascade connected with the isolated DC-to-DC converter. The isolated DC-to-DC converter may comprise a DC-to-AC converter connected via a transformer with an AC-to-DC converter. The non-isolated DC-to-DC converter may be a buck, boost or buck/boost converter.

The term "isolated DC-to-DC converter" refers above and in the following to a DC-to-DC converter comprising a galvanic isolating element, such as a galvanic isolating transformer. In an "isolated DC-to-DC converter" this galvanic isolating element enables energy transfer but prohibits a direct conduction path between the input and output.

The term "non-isolated DC-to-DC transformer" refers above and in the following to a DC-to-DC converter, in which converter the input and output are not galvanic isolated from each other.

According to an embodiment of the invention, the DC distribution bus is a DC distribution bus at medium voltage level.

According to a preferred embodiment of the invention, the voltage level of the DC distribution bus is between 10 kV and 50 kV.

According to an embodiment of the invention, the renewable energy source is a low voltage energy source, such as a solar power plant or any other renewable power plant.

According to an embodiment of the invention, the renewable energy source is a medium voltage energy source, such as a wind power plant, a solar power plant or any other renewable power plant.

According a preferred embodiment of the invention, the voltage level of the renewable energy source is between 600V and 10 kV. In other words, a converter unit, which may be seen as a modular isolated DC-to-DC converter (comprising an isolated and a non-isolated DC-to-DC converter), is used for interconnecting, for example, a wind power generator with a DC distribution bus, for example at medium voltage level. This converter unit may be used to perform maximum power point energy extraction from the renewable source, since the two DC-to-DC converters may be controlled independently from each other. For example, the non-isolated converter may be used for controlling the power flow between the renewable energy source and the distribution bus and the isolated converter may be controlled in open loop (with a constant switching frequency). Due to these reasons, the transformer providing the galvanic isolation of the isolated converter may be constructed for higher frequencies and optimal efficiency and may therefore be lighter and cheaper.

In summary, due to the non-isolated DC-to-DC converter, a second set of transformers may be eliminated, which may result in reducing the weight, size and footprint of the overall installation. For example, in offshore renewable energy installations, space is very limited and therefore size, weight and footprint may be extremely important metrics. By using a medium frequency transformer inside the isolated DC-to-DC converter within a converter unit, significant saving in weight and size may be achieved, for example leading to installation directly inside a nacelle of a wind power generator.

The term "cascade connected" means that outputs of a first part of the converter system are connected with inputs of a second part of the converter system. For example, the two outputs of the isolated DC-to-DC converter are connected with inputs of the non-isolated DC-to-DC converter.

According to an embodiment of the invention, the converter unit comprises at least two converter cells, each converter cell comprising an isolated DC-to-DC converter cascade connected with a non-isolated DC-to-DC converter. Inputs of the isolated DC-to-DC converters are connected in parallel to the renewable energy source and outputs of the non-isolated DC-to-DC converters are connected in series between lines of the DC distribution bus. The converter cells may be seen as submodules or subconverters of the converter unit. These submodules are connected in parallel at the side of the renewable energy source and in series at the side of the distribution bus. The series connecting at the side of the distribution bus makes it possible to convert the DC output voltage of the converter unit to a multiple of the DC input voltage. With the isolated DC-to-DC converter, every converter cell comprises a galvanic isolation that may be provided by a transformer.

According to an embodiment of the invention, the converter system further comprises at least two converter units connected in parallel to the DC distribution bus, each converter unit connectable to a renewable energy source. Thus, the converter system may comprise a plurality of parallel connected converter units and each converter unit may comprise a plurality of converter cells, which are connected in parallel at the side of the energy source and in series at the side of the DC distribution bus.

According to an embodiment of the invention, the isolated DC-to-DC converter comprises a first DC-to-AC converter, a transformer and a second AC-to-DC converter, which are cascade connected. The transformer may provide the galvanic isolation and may be used to step up or step down the voltage from the energy source.

According to an embodiment of the invention, the converter unit comprises an AC-to-DC converter for connecting an AC power source with the isolated DC-to-DC converter. In the case of a wind power generator, which usually generates an AC output voltage, this AC output voltage may be rectified before input to the isolated DC-to-DC converter.

According to an embodiment of the invention, the converter unit comprises a DC-to-DC converter for connecting a DC power source with the isolated DC-to-DC converter. Such a DC power source may be a photovoltaic module.

According to an embodiment of the invention, the non-isolated DC-to-DC converter is a buck, boost or buck/boost converter. A buck and/or boost converter may comprise two semiconductor switches connected in series between two first outputs. One second output is connected with a midpoint between the two semiconductor switches via an inductor and a second output may be connected directly to one of the first outputs. A capacitor may be connected between the two second outputs.

According to an embodiment of the invention, a superior converter system comprises at least two DC distribution buses, each DC distribution bus connected to a converter system comprising one or more converter units for interconnecting one or more renewable energy sources with the respective DC distribution bus being at least at medium voltage level. Each DC distribution bus is connected to a first side of a non-isolated grid-side DC-to-DC converter and second sides of the non-isolated grid-side DC-to-DC converters are connected in series between lines of a DC distribution grid. It has to be noted that the non-isolated DC-to-DC converter interconnected between the renewable energy source and the DC distribution bus may be seen as an energy source side DC-to-DC converter, while the non-isolated DC-to-DC converter between the DC distribution bus and the DC distribution grid is a grid-side DC-to-DC converter.

According to an embodiment of the invention, the DC distribution grid voltage level is higher than the DC distribution bus voltage level.

According to an embodiment of the invention, the DC distribution grid is a high voltage DC distribution grid.

The term "high voltage" refers above and in the following to voltages equal or above 50 kV. High voltage is specified only by a lower voltage limit and does not impose an upper limit. High voltage, as used in this application, includes what other references may refer to as ultra-high or extra-high voltage, e.g. 500 kV, 700 kV and higher voltages.

With the series connected grid side converters, the medium voltage (for example up to 20 kV or 30 kV) from the distribution buses may be converted by multiplication into the high voltage (for example up to 100 kV or more) of the DC distribution grid.

According to an embodiment of the invention, the non-isolated grid-side converters are buck, boost or buck/boost converters. These converters may have the same layout as the energy source side converters.

The superior converter system may be based on collection, distribution and transmission of DC energy at different voltage levels (such as medium voltage between renewable energy sources and a distribution bus and high voltage between the distribution bus and the high voltage distribution grid). With the superior converter system, transformers, which usually are heavy and expensive, may be eliminated, for example low-frequency transformers and/or a second set Of isolated medium frequency transformers.

A further aspect of the invention relates to a renewable energy power station. For example, the power station may be an (offshore) wind park or wind farm or may be a photovoltaic station.

According to an embodiment of the invention, the renewable energy power station comprises at least one renewable energy source and a converter system or a superior converter system as described in the above and in the following for interconnecting the renewable energy source with a DC power distribution grid. The DC power distribution grid may be a large scale distribution grid and/or a high voltage distribution grid (for example adapted for transmitting electrical power with more than 100 kV).

According to an embodiment of the invention, the converter system of the renewable energy power station is part of a superior converter system, as described above and in the following, for interconnecting the renewable energy source with the DC distribution grid.

According to an embodiment of the invention, the at least one renewable energy source comprises at least one of a wind power generator and a photovoltaic module. The renewable energy power station may comprise a plurality of renewable energy sources, each of which is connected to a converter unit, which interconnects the respective renewable energy source with a DC distribution bus. The superior converter system may be used to connect offshore wind fauns to a main distribution grid. However, the superior converter system also may be used with other renewable energy sources such as large photovoltaic power plants which are by nature DC sources.

A further aspect of the invention relates to a method of operation of a converter system, which may be performed by a controller of the converter system.

According to an embodiment of the invention, the converter system comprises a converter unit for interconnecting a renewable energy source with a DC distribution bus, wherein the converter unit comprises a first DC-to-DC converter and a second DC-to-DC converter, which are cascade connected. This may be a converter unit as described in the above and in the following, in particular a converter unit with at least two converter cells as described above and in the following.

In particular, the converter unit may comprise an AC-to-DC converter directly connected to a wind generator and on the other side connected to at least two parallel connected converter cells, each of which comprise a first, isolated DC-to-DC converter and a second, non-isolated DC-to-DC converter, which are cascade connected.

Firstly, the AC-to-DC converter may control frequency and voltage of the wind generator.

Secondly, the first, isolated DC-to-DC converter may transform a DC voltage from the generator side into a DC voltage at the distribution side. This may be achieved by a transformer of the isolated DC-to-DC transformer (and its turns ratio) and/or by a parallel to series connection of the converter cells.

Thirdly, the second, non-isolated DC-to DC converter may control the distribution side DC link voltage generated by the first DC-to-DC converter by controlling the power flow.

According to an embodiment of the invention, the method comprises: controlling the first (isolated) DC-to-DC converter in open loop; and controlling a power flow of the converter unit with the second (non-isolated) DC-to-DC converter, which is cascade connected with the first DC-to-DC converter. In such a way, the first DC-to-DC converter may be used merely for transforming the voltage to a higher level and/or may be operated at constant frequency, which may improve the efficiency of the first DC-to-DC converter.

According to an embodiment of the invention, the method further comprises: controlling an AC-to-DC converter interconnecting a renewable energy source and the first DC-to-DC converter such that an operating point of the renewable energy source is optimized. The second DC-to-DC converter may be used only to control the output voltage of the AC-to-DC converter (for example through the isolated DC-to-DC converter in a DC link between these two converters). In such a way, the two control objectives may be reached with two different converters, which may minimize losses and may enhance the power extracted from the renewable energy source. Furthermore, a smaller and cheaper transformer may be used for the isolated converter.

Due to the two separate DC-to-DC converters, a maximum power extraction from renewable energy sources (wind, photovoltaic, etc.) is possible at the optimal operating point.

According to an embodiment of the invention, the method further comprises: detecting a fault in the converter unit; opening a switch interconnecting the converter unit with the DC distribution bus, when the fault is detected; after detecting the fault, modulating a non-isolated DC-to-DC converter such that a current and/or a voltage in the converter unit is reduced before the switch opens. The non-isolated converter may be used for short circuit limitation and overload protection for the converter system. Since the non-isolated converter comprises semiconductor switches, which react fast compared to a mechanical switch, the non-isolated converter may be used to limit voltages and currents before the (comparatively slow) switch opens. Short circuit and overcurrent limitation at the high voltage DC level may be integrated into the converter system.

As already described, each converter unit may comprise submodules that are connected in parallel at the side of the energy source and in series at the side of the distribution bus. In particular, the second DC-to-DC converters may be buck, boost or buck/boost converters connected in series at one side. According to an embodiment of the invention, the method relates to a converter system, which converter system is part of a superior converter system as described above and in the following, the method further comprises: pulse width modulating the second DC-to-DC converters with phase shifted pulse patterns, such that voltage distortions generated in the DC distribution bus have higher frequencies than the pulse patterns. The series connected distribution bus side DC-to-DC converters may be switched in such a way that their switching instants are offset (phase shifted) with respect to each other. Such voltage distortions caused by the switching have a higher frequency and, for example, may be filtered out more easily.

As already described, DC distribution buses may be connected via grid side DC-to-DC converters with a distribution grid. Also these converters may be buck, boost or buck/boost converters connected in series at one side.

According to an embodiment of the invention, the method further comprises: pulse width modulating the grid-side DC-to-DC converters with phase shifted pulse patterns, such that voltage distortions generated in the DC distribution grid have higher frequencies than the pulse patterns. The grid-side non-isolated DC-to-DC converter also may be operated like the energy source side isolated DC-to-DC converter for lowering harmonic distortion.

According to an embodiment of the invention, the method further comprises: detecting a fault in the superior converter system and/or converter system and/or converter unit; opening a switch interconnecting the converter unit with the DC distribution bus, when the fault is detected; after detecting the fault, modulating a non-isolated DC-to-DC converter such that a current and/or a voltage in the converter unit is reduced before the switch opens. The non-isolated converter may be used for short circuit limitation and overload protection for the converter system. Since the non-isolated converter comprises semiconductor switches, which react fast compared to a mechanical switch, the non-isolated converter may be used to limit voltages and currents before the (comparatively slow) switch opens. Short circuit and overcurrent limitation at the high voltage DC level may be integrated into the converter system.

A further aspect of the invention relates to a controller for a converter system or a superior converter system, which is adapted for performing the method as described in the above and in the following. For example, the method may be implemented in hardware (in a DSP or FPGA) or in software. In the latter case, the controller may comprise a processor for executing a computer program that implements the method.

It has to be understood that features of the method as described in the above and in the following may be features of the converter system, the superior converter system, the renewable energy power station and the controller as described in the above and in the following, and vice versa.

In summary, the superior converter system may be seen as a DC renewable energy collector system configured for connecting a plurality of renewable energy sources to a high voltage DC transmission system (i.e. a high voltage DC distribution grid). The superior converter system may be seen as a multistage system with a galvanically isolated medium voltage DC-to-DC converter, which allows maximum power extraction from the renewable energy sources. A connection from an medium voltage DC distribution bus to an high voltage DC distribution grid is possible with a reduced number of power conversion stages when compared to the above mentioned AC-to-AC collector systems and AC-to-DC collector systems utilizing a plurality of cascaded isolated DC-to-DC converters. There is no need to utilize low frequency transformers to realize the interconnection. The converter system and the superior converter system and the control method not only may increase the efficiency of the power distribution/transmission system but also may allow operation of the renewable energy source at a nominal operating point. The topological layout of the converter system (paralleled converter units with paralleled converter cells) may allow for easy scalability and adaptation of the output/input voltages, which may increase the modularity of the converter system.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
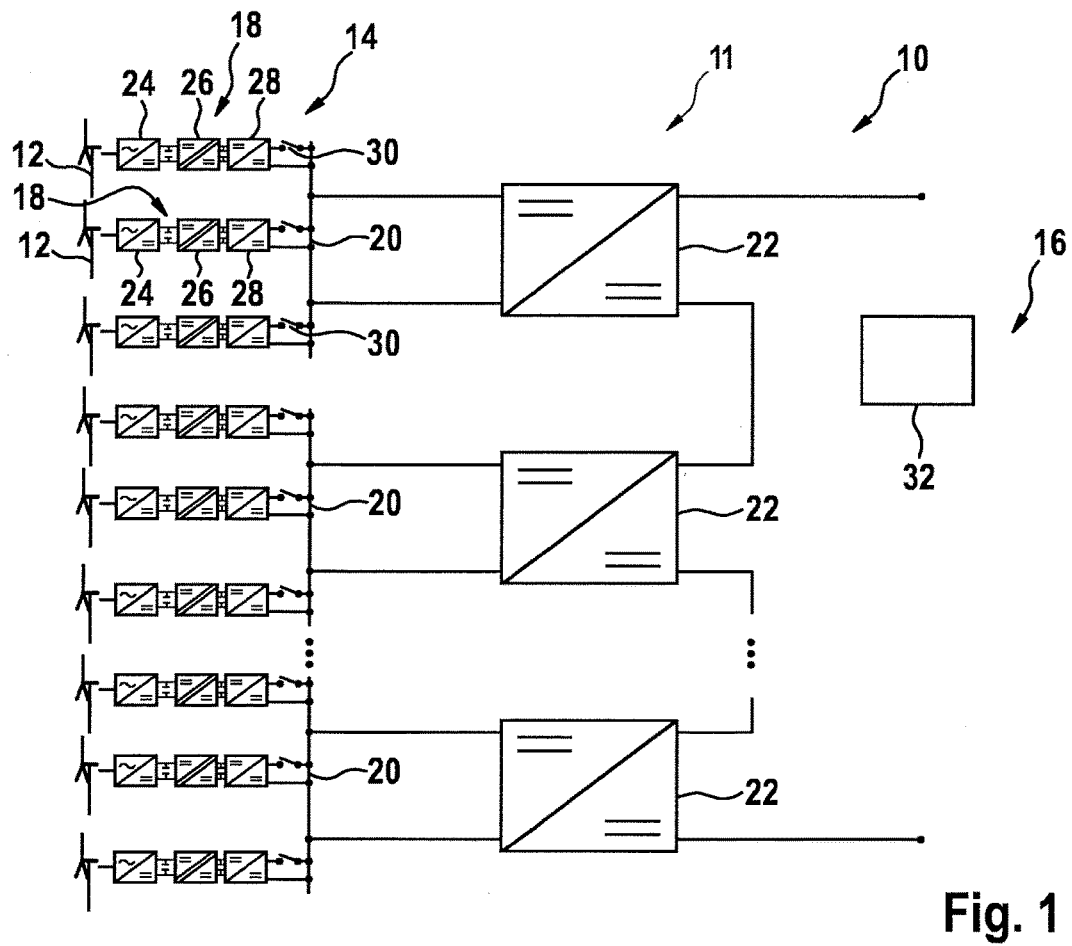
FIG. 1 schematically shows a renewable energy power station according to an embodiment of the invention.

FIG. 1 shows a renewable energy power station comprising a plurality of renewable energy sources 12 in the form of wind power generators (wind turbines). The renewable energy sources 12 are connected via a superior converter system 11 with a high voltage distribution grid 16.

In a first, medium voltage stage, each renewable energy source 12 is connected via a converter unit 18 with a distribution bus 20 at medium voltage level. In a second, high voltage stage, the superior converter system 11 comprises a plurality of distribution buses 20, which are connected via grid side DC-to-DC converters 22 with the high voltage distribution grid 16.

Each converter unit 18 comprises an AC-to-DC converter 24, an isolated DC-to-DC converter 26 and a non-isolated DC-to-DC converter 28, which are cascade connected.

The AC-to-DC converter 24 is used for converting an AC voltage from a wind power generator 12 into a DC voltage to be input into the isolated DC-to-DC converter 26 and may be omitted in the case of a renewable energy source providing DC voltage such as a photovoltaic module. In this case, the AC-to-DC converter 24 also may be replaced with a non-isolated DC-to-DC converter, also for achieving maximum power point operation of the photovoltaic system. The AC-to-DC converter 24 may be a simple multi-phase diode rectifier or an active rectifier with a two-level, three-level or multi-level structure.

The AC-to-DC converter 24 allows the wind power generators 12 to be driven at the speed of maximum efficiency or maximum power transfer under all conditions (wind speed, irradiation, etc.). Maximum power point tracking (MPPT) may be achieved that maximizes the efficiency of the converter system 14.

The DC-to-DC converters 26, 28 are used to regulate the output voltage of the AC-to-DC converter 24 by controlling the power delivered to the load. In addition, they are used to step-up the voltage from the output of the generator AC-to-DC converter 24 (which may be low voltage or medium voltage) to the desired medium voltage of the distribution bus 20, where the energy from different wind power generators 12 is collected. A DC medium voltage may extend up to 50 kV by considering that a medium voltage AC range goes up to 36 kV.

The DC-to-DC converters 26, 28 may be connected via a protection switch 30 to the distribution bus 20.

The superior converter system 11 furthermore comprises a controller 32 for controlling the converters 24, 26, 28 and 22.

Figure 2:
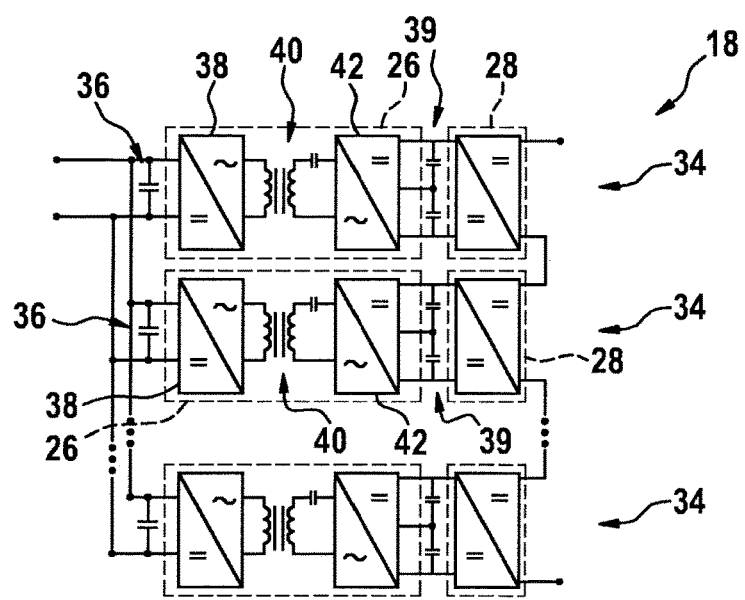
FIG. 2 schematically shows a converter unit for a converter system according to an embodiment of the invention.

FIG. 2 shows a converter unit 18 (without the AC-to-DC converter 24) in more detail. The converter unit 18 comprises a plurality of converter cells 34 (or converter sub-modules/building blocks), which on the side of the renewable energy source 12 are connected in parallel and on the side of the distribution bus 20 are connected in series. The number of converter cells 34 connected in series on the distribution bus side may depend on the voltage level of the distribution bus and/or the voltage ratings of the power semiconductor devices. The converter units 18 may also be placed in parallel to on energy source 12 depending on the required power. On the energy source side, the converter cells 34 may be connected in series/parallel to deal with the power and output voltage of the AC-to-DC converter 24.

Each converter cell 34 comprises a first DC link 36, an isolated DC-to-DC converter 26, a second DC link 39 and a non-isolated DC-to-DC converter 28 (all cascade connected).

The isolated DC-to-DC converter 26 comprises a DC-to-AC converter 38, a medium-frequency transformer 40 and an AC-to-DC converter 42 (cascade connected). For example, the isolated DC-to-DC converter 26 may be a resonant LLC converter. In general, the isolated DC-to-DC converter 26 may be configured using half-bridge, full-bridge, three-level or multi-level structures. In addition, the power processing may be realized in a resonant or PWM mode. However, clear advantages, such as low switching losses are presented when the power processing is realized in resonant mode. Furthermore, in order to obtain the maximum efficiency, the DC-to-DC converter 26 is operated in open loop at the point where maximum efficiency is obtained in the converter 26.

The isolated DC-to-DC converter 26 may only provide the isolation of the converter cell 34, which at the same time allows the series connection of the converter cells 34 to reach the medium voltage level. In addition, the DC-to-DC converter 28 may be used for controlling the output voltage of the AC-to-DC converter 24.

The non-isolated DC-to-DC converter 28 is used to regulate the power delivered to the load and to protect the converter system 14 and the superior converter system 11 against overload and short circuit conditions as will be explained below.

Furthermore, the operation of each converter cell 34 may be phase shifted to provide ripple cancellation in the input and output filters.

Figure 3:
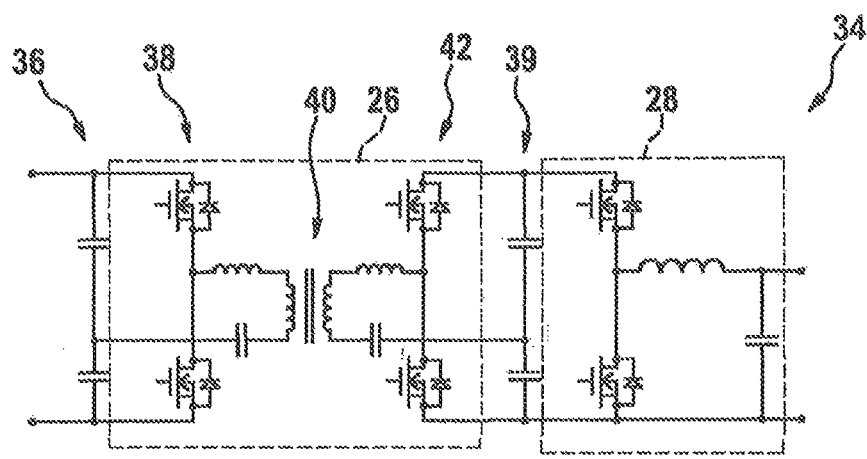
FIG. 3 schematically shows a converter cell of the converter unit of FIG. 2.

FIG. 3 shows an example of a converter cell 34. The converters 38, 42 may be realized with half-bridges in parallel to the DC links 36, 39. Midpoints of the half-bridges are coupled by the transformer 40. In general, the converter 28 may be a buck, boost or buck/boost converter.

Figure 4:
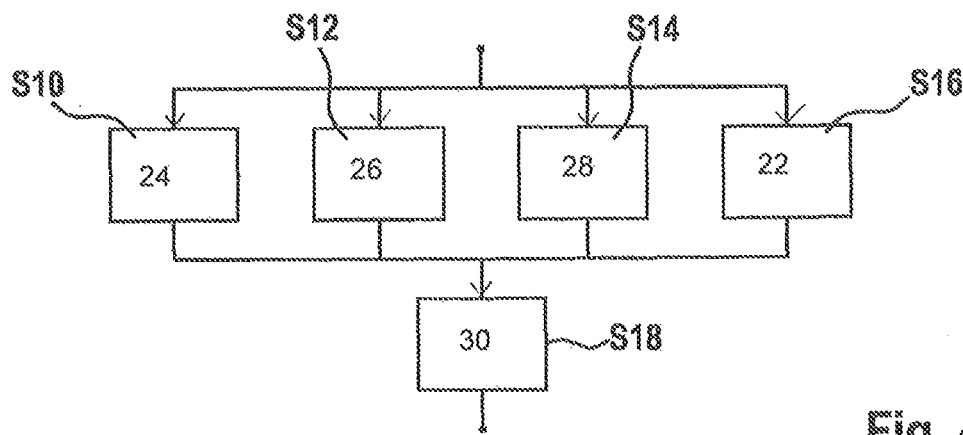
FIG. 4 shows as flow diagram for a method for controlling a superior converter system according to an embodiment of the invention.

FIG. 4 shows a flow diagram for a control method of the superior converter system 11 that may be performed by the controller 32. In general, the controller 32 measures currents and/or voltages in the superior converter system 11 and controls the converters 22, 24, 26, 28 based on these measurements.

The controller 32 may comprise central and/or local components and/or may control the converters 22, 24, 26, 28 in parallel.

In step S10, the AC-to-DC converters 24 are controlled such that an operating point of the respective renewable energy source 12 is optimized.

In step S12, the isolated DC-to-DC converters 26 are controlled in open loop at the designed operating point.

In step S14, the distribution bus side non-isolated DC-to-DC converters 28 are controlled such that a desired DC link voltage 39 is achieved through control of the power flow of the respective converter cell 34.

In step S16, the grid side non-isolated DC-to-DC converters 22 are controlled such that the desired output voltage of 22 as a fraction of the total grid voltage 16 is achieved.

With respect to steps S14 and S16, the converters 28 connected in series at their outputs between the lines of the DC distribution bus 20 of one converter unit 18 and/or the converters 22 connected in series between the lines of the DC distribution grid 16 may be pulse width modulated.

Figure 5:
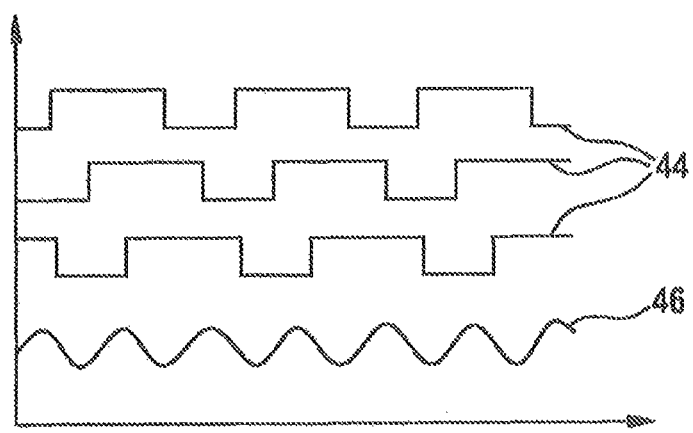
FIG. 5 shows a diagram illustrating phase shifted pulse patterns for the method of FIG. 4.

FIG. 5 shows a diagram with pulse width modulation signals or pulse patterns 44 for three converters 22 or 28. The pulse patterns 44 are phase shifted with respect to each other, such that current distortions 46 generated in the DC distribution bus 20 or distribution grid 16 have higher frequencies than the pulse patterns 44, as indicated in FIG. 5. In general, the frequency increase of the current distortions 46 is proportional to the number of converters. For example, with three converters, the frequency of the curve 46 is three times the frequency of the pulse patterns 44. Also the ripple of the current distortion 46 may have another form, for example it may be triangular instead of sinusoidal.

In particular, the series connected DC-to-DC converters 28 and/or 22 are operated with a phase shift angle (interleaving operation) in order to provide ripple cancellation at the medium voltage DC and/or high voltage DC level. As a result, the DC-to-DC converters 28, 22 can operate at low switching frequency, reducing the switching losses in the converters 28, 22, and still have small filter requirements. Furthermore, the interleaving allows the operation of the converters 28, 22 in discontinuous conduction mode or critical conduction mode, eliminating the reverse recovery losses in the converters 28, 22 and at the same time guaranteeing low filter requirements.

Figure 6:
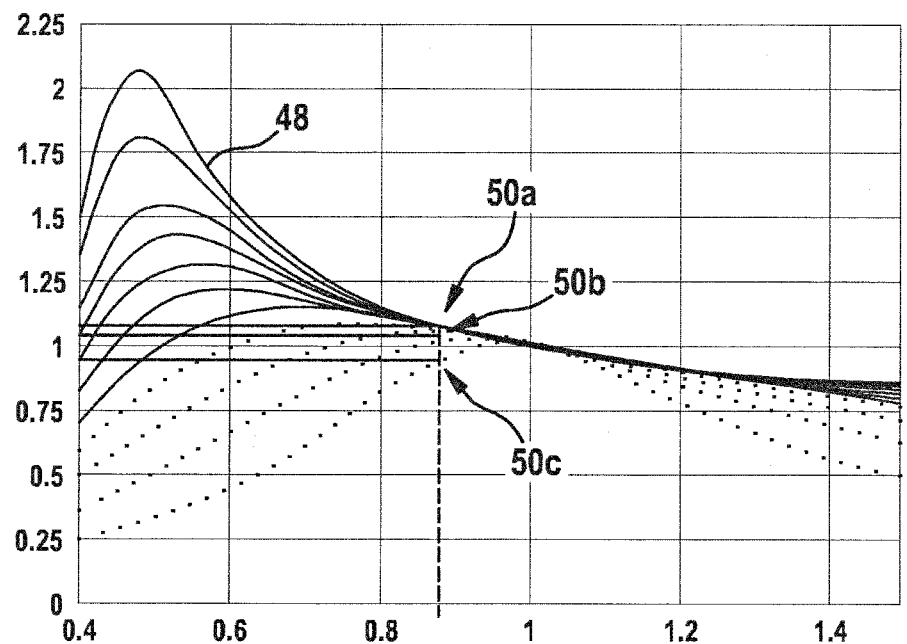
FIG. 6 shows a diagram illustrating a gain of a DC-to-DC converter for the converter cell of FIG. 3.

As already mentioned, the converters 26 are controlled in open loop. As an example, FIG. 6 shows the DC gain characteristics of an LLC resonant converter 26. In this diagram, each curve 48 represents a load characteristic from no-load to overload condition. In the diagram, the normalized switching frequency is depicted on the horizontal axis and the DC gain on the vertical axis.

Three possible operating conditions are also indicated for the converter: light (50*a*), nominal (50*b*) and overload (50*c*). These operating points are defined by the DC gain characteristics of the converter 26, the input voltage (rectifier voltage of the AC-to-DC converter 24) and the output voltage (medium voltage DC at the distribution bus 20). For simplification, one may consider the medium voltage DC collector 20 as a stiff voltage source which is slowly varying accordingly to the energy generated by the wind power generators 12 and the demanded load from the grid 16. If the output voltage 36 of the AC-to-DC converter 24 were not tightly regulated while following the maximum power point for the wind power generator 12, the isolated DC-to-DC converter 26 will normally move around the nominal operating point 50*b*. As can be seen, a small variation away from the point 50*b* can easily result in an overload condition 50*c*. In the case 50*c*, the fraction of the medium voltage DC appearing on DC link 39 of the isolated DC-to-DC converter 26 is lower than the voltage 36 at the output terminals of the AC-to-DC converter 24. The severity of the overload condition will be determined by the difference between these voltages. In addition, one can realize that the operating range of the converter is quite narrow, but very efficient, if used at one operating point 50*b*.

Thus, the isolated DC-to-DC converter 26 of each converter unit 18 is controlled in open loop at the operation point 50*b*. To achieve the desired voltage gain, the DC-to-DC converter 28 is controlled accordingly.

Figure 7:
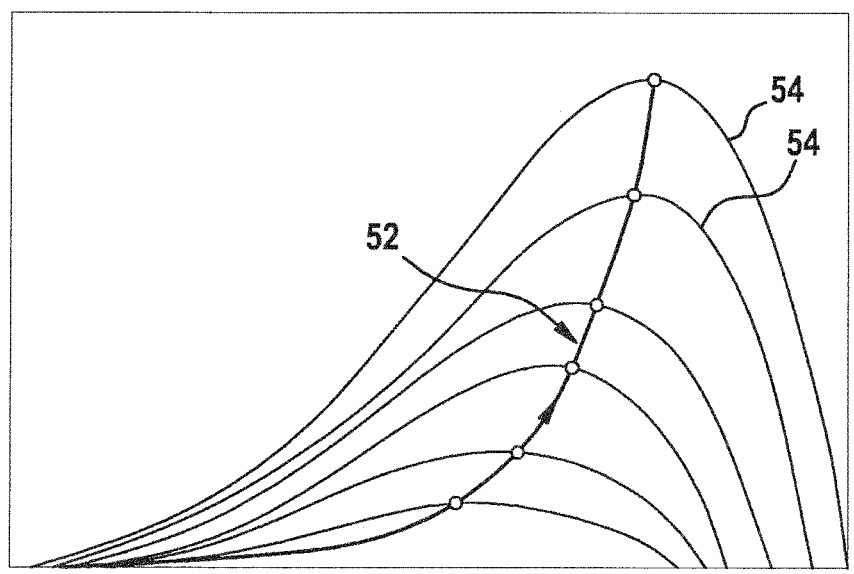
FIG. 7 shows a diagram illustrating a power trajectory of a wind power generator in the power station of FIG. 1.

As described before, in step S10, the AC-to-DC converter 24 connected to the wind power generator 12 controls the generator voltage and generator current to extract the maximum power based on the wind speed as shown in the figure FIG. 7, which shows a diagram with an optimum power trajectory 52. The diagram depicts the rotational speed of the wind power generator 12 on the horizontal axis and the power extracted on the vertical axis. Different power curves 54 for different operating conditions are shown.

This control strategy to control the maximum power will not allow control of the DC link voltage by the AC-to-DC converter 24. If the power flow out of DC-to-DC converter 28 is not balanced with the power flow in by the AC-to-DC converter 24, the voltage in the DC link 36 will vary. Thus, in order to keep the DC link voltage constant, the non-isolated DC-to-DC converter 28 is used to control the power flow to the distribution bus 20 to match the power coming into the DC link 36 from the AC-to-DC converter 24.

If instead the resonant DC-to-DC converter 26 is used for this task, the frequency of operation would have to be varied to control the power flow which would move the converter 26 from the optimal efficiency operating point 50*b* shown in FIG. 5.

To further clarify, if converter cell 34 is operated without 28 at the nominal point and the grid voltage stays fixed, the power will flow passively through the DC-to-DC converter 26. However, if the voltage in the distribution bus 20 begins to decrease, the DC link voltage 36 will follow because of the fixed voltage gain. This however would result in an overload condition for the AC-to-DC converter 24 which would move 26 away from the nominal operating point 50*b*. If on the other hand the voltage 20 rises, the DC link voltage 36 will also rise eventually coming to an overvoltage condition for the AC-to-DC converter 24 and the DC-to-DC converter 26. To avoid these conditions, the DC-to-DC converter 26 would have to be operated away from the nominal point 50*b*. The design of the DC-to-DC converter 26 would have to be changed to give steeper gain curves for better regulation, resulting in a less efficient DC-to-DC converter 26. In addition, the output current cannot be controlled by the DC-to-DC converter 26 in the case of an overload condition.

To keep the maximum power point for the wind power generator 12, the maximum efficiency point 50*b* and optimal converter design for the isolated DC-to-DC converter 26, an additional DC-to-DC converter 28 is included. This can be a buck, boost or buck/boost converter 28 on the output side of the DC-to-DC converter 26, to control the power flow and the current in the case of an overload condition. With this configuration, the DC-to-DC converter 26 can stay at a constant frequency at the nominal point 50*b* and the converter 28 controls the power flow to maintain the DC link 36 at its fixed reference value. Thus, the control tasks of the controller 32 are equally divided between the AC-to-DC converter 24 for the generator control and the DC-to-DC converter 28 for the DC link voltage control.

Figure 8:
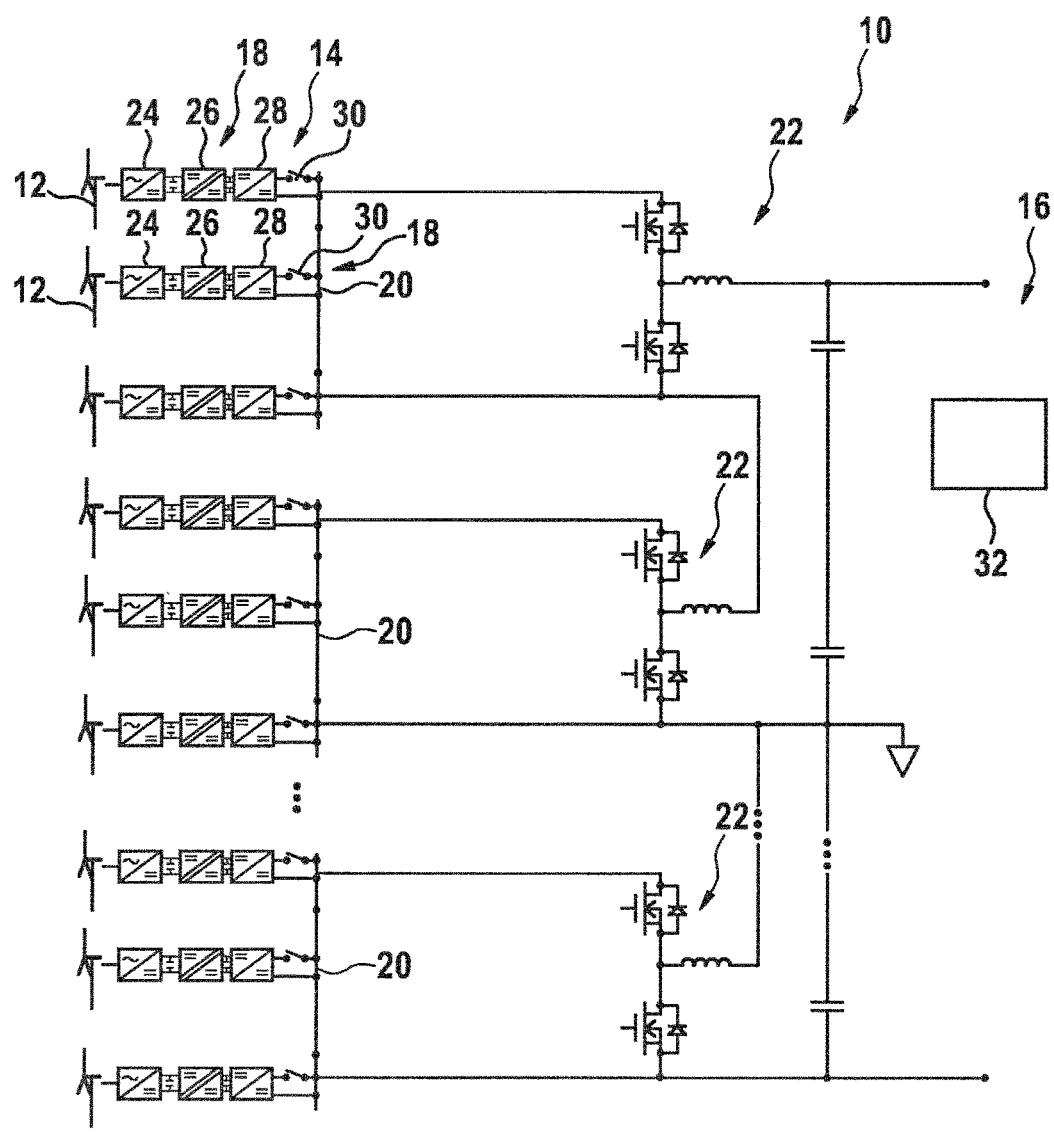
FIG. 8 shows a further embodiment of a renewable energy power station according to an embodiment of the invention.

FIG. 8 shows one of the possible implementations of DC-to-DC converters 22, where bidirectional high voltage DC-to-DC converters 22 are utilized. All of the DC distribution buses 20 are connected in parallel to first outputs of the DC-to-DC converters 22, which are connected in series with their second outputs to feed the high voltage DC distribution grid 16.

Additionally, the DC-to-DC converters 22 are able to tightly regulate the output voltage, to limit the load current and to protect the distribution buses 20 against short circuit conditions in the high voltage DC distribution grid 16. Similar tasks may be performed by the DC-to-DC converters 28.

Turning back to FIG. 4, the DC-to-DC converters 22 (as well as the DC-to-DC converters 28) additionally may be used for overload protection.

In step S18, the controller 32 detects a fault in the superior converter system 11, for example a short circuit or an overload condition in the DC distribution grid 16. In consequence, the controller 32 opens a switch 30 interconnecting the converter unit 18 with the DC distribution bus 20. After the fault is detected, the controller 32 modulates the DC-to-DC converters 22 and/or 28 such that a current and/or a voltage in the converter unit 18 is reduced before the switch 30 opens.

For example, as shown in FIG. 1 and in FIG. 8, the proposed structure will allow several distribution buses 20 to be connected to the high voltage DC distribution grid 16 resulting in a multi-terminal high voltage DC system. In such a case, and considering that the converter units 18 are already protected against short circuit and overload conditions due to the non-isolated DC-to-DC converter 28, the use of buck, boost or buck/boost type DC-to-DC converters is possible for the implementation of the DC-to-DC converters 22. This way, the overall superior converter system 11 may be protected against short circuit and overload conditions independent of the power flow direction. This feature may minimize the need for fast protection elements, requiring mainly mechanical disconnectors 30 and fuses, and thus removing dependency on the development of DC circuit breaker technology.

Please note that the simplified half-bridge stages for the converters 22, 28 are shown for illustration purposes, and in reality a series connection of IGBTs may be needed to realize a DC-to-DC converter 22, 28. For example, with state of the art high voltage DC technology it is possible to simply stack semiconductors to handle the high voltage (for example 20 kV).

FIG. 8 also shows a possible connection to the ground potential. For example, one of the middle DC-to-DC converters 22 may be connected to ground.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

10 renewable energy power station
11 superior converter system
12 renewable energy source
14 converter system
16 high voltage DC distribution grid
18 converter unit
20 medium voltage DC distribution bus
22 grid side DC-to-DC converter
24 AC-to-DC converters
26 isolated DC-to-DC converter
28 non-isolated DC-to-DC converter
30 protection switch
32 controller
34 converter cell
36 first DC link
38 DC-to-AC converter
39 second DC link
40 transformer
42 AC-to-DC converter
44 pulse pattern
46 voltage distortion
48 load characteristics
50a, 50b, 50c load conditions
52 optimal power trajectory
54 power curve

The invention claimed is:

1. A converter system for interconnecting renewable energy sources with a DC distribution bus being at least medium voltage level, comprising:
   a converter unit for interconnecting a renewable energy source with the DC distribution bus;
   wherein the converter unit comprises:
   an isolated DC-to-DC converter connectable to the renewable energy source; and
   a non-isolated DC-to-DC converter connectable to the DC distribution bus, which is cascade connected with the isolated DC-to-DC converter.

2. The converter system of claim 1,
   wherein the converter unit comprises at least two converter cells, each converter cell comprising an isolated DC-to-DC converter cascade connected with a non-isolated DC-to-DC converter;
   wherein inputs of the isolated DC-to-DC converters are connected in parallel to the renewable energy source; and
   wherein outputs of the non-isolated DC-to-DC converters are connected in series between lines of the DC distribution bus.

3. The converter system of claim 2, further comprising at least two converter units connected in parallel to the DC distribution bus, each converter unit connectable to a renewable energy source.

4. The converter system of claim 1, further comprising:
   at least two converter units connected in parallel to the DC distribution bus, each converter unit connectable to a renewable energy source.

5. The converter system of claim 1, wherein the isolated DC-to-DC converter comprises a first DC-to-AC converter, a transformer and a second AC-to-DC converter, which are cascade connected.

6. The converter system of claim 1, wherein the converter unit comprises one of an AC-to-DC converter for connecting an AC power source with the isolated DC-to-DC converter and a DC-to-DC converter for connecting a DC power source with the isolated DC-to-DC converter.

7. The converter system of claim 1, wherein the non-isolated DC-to-DC converter is a buck, boost or buck/boost converter.

8. A renewable energy power station, comprising:
   at least one renewable energy source; and
   a converter system according to claim 1 for interconnecting the renewable energy source with the DC distribution grid.

9. A renewable energy power station according to claim 8, wherein the converter system is part of a superior converter system for interconnecting the renewable energy source with the DC distribution grid, the superior converter system comprising at least two DC distribution buses, each DC distribution bus connected to the converter system, the converter system comprising at least one converter unit for interconnecting a renewable energy source with the respective DC distribution bus, each DC distribution bus being at least at medium voltage level;
   wherein the at least one converter unit comprises an isolated DC-to-DC converter connectable to the renewable energy source and a non-isolated DC-to-DC converter connectable to the DC distribution bus, which is cascade connected with the isolated DC-to-DC converter;

wherein each DC distribution bus is connected to a first side of a non-isolated grid-side DC-to-DC converter;

wherein second sides of the non-isolated grid-side DC-to-DC converters are connected in series between lines of a DC distribution grid.

10. A superior converter system,
comprising:
at least two DC distribution buses, each DC distribution bus connected to a converter system comprising at least one converter unit for interconnecting a renewable energy source with a respective DC distribution bus, each respective DC distribution bus being at least at medium voltage level wherein the at least one converter unit comprises an isolated DC-to-DC converter connectable to the renewable energy source and a non-isolated DC-to-DC converter connectable to the DC distribution bus, which is cascade connected with the isolated DC-to-DC converter;

wherein each DC distribution bus is connected to a first side of a non-isolated grid-side DC-to-DC converter;

wherein second sides of the non-isolated grid-side DC-to-DC converters are connected in series between lines of a DC distribution grid.

11. The superior converter system of claim 10, where the DC distribution grid voltage level is higher than the DC distribution bus voltage level.

12. The superior converter system of claim 10,
wherein the non-isolated grid-side DC-to-DC converters are buck, boost or buck/boost converters.

13. A method of operating a converter system, wherein the converter system comprises a converter unit for interconnecting a renewable energy source with a DC distribution bus, wherein the converter unit comprises a first isolated DC-to-DC converter connectable to the renewable energy source and a second non-isolated DC-to-DC converter connectable to the DC distribution bus, which are cascade connected, the method comprising:
controlling the first DC-to-DC converter in open loop; and
controlling a power gain of the converter unit with the second DC-to-DC converter.

14. The method of claim 13,
wherein the converter unit comprises an AC-to-DC converter interconnecting a renewable energy source and the first DC-to-DC converter; and
the method further comprising controlling the AC-to-DC converter such that an operating point of the renewable energy source is optimized.

15. The method of claim 13, further comprising:
detecting a fault in the converter system; and
after detecting the fault, modulating a non-isolated DC-to-DC converter such that a current and/or a voltage in the converter unit is reduced before a switch interconnecting the converter unit with the DC distribution bus opens, and thereafter opening the switch.

16. The method of claim 13,
wherein the converter unit comprises at least two converter cells, each converter cell comprising a first DC-to-DC converter and a second DC-to-DC converter, wherein the first DC-to-DC converters are connected in parallel to the renewable energy source and the second DC-to-DC converters are connected in series between lines of the DC distribution bus;
the method further comprising pulse width modulating the second DC-to-DC converters with phase shifted pulse patterns such that voltage distortions generated in the DC distribution bus have higher frequencies than the pulse patterns.

17. The method of claim 13,
wherein the converter system is part of a superior converter system, wherein the superior converter system comprises at least two DC distribution buses, each DC distribution bus connected to at least one converter unit for interconnecting a renewable energy source with the respective DC distribution bus;
wherein the at least one converter unit comprises an isolated DC-to-DC converter connectable to the renewable energy source and a non-isolated DC-to-DC converter connectable to the DC distribution bus, which is cascade connected with the isolated DC-to-DC converter;
wherein each DC distribution bus is connected to a first side of a grid-side DC-to-DC converter and wherein second sides of the grid-side DC-to-DC converters are connected in series between lines of a DC distribution grid;
the method further comprising pulse width modulating the grid-side DC-to-DC converters with phase shifted pulse patterns, such that voltage distortions generated in the DC distribution grid have higher frequencies than the pulse patterns.

18. The method of claim 17, further comprising:
detecting a fault in the superior converter system;
after detecting the fault, modulating a non-isolated DC-to-DC converter such that a current and/or a voltage in the converter unit is reduced before a switch interconnecting the converter unit with the DC distribution bus opens, and thereafter opening the switch.

19. A controller for a converter system or a superior converter system, wherein the converter system or the superior converter system comprises a converter unit for interconnecting a renewable energy source with a DC distribution bus, wherein the converter unit comprises a first DC-to-DC converter connectable to the renewable energy source and a second DC-to-DC converter connectable to the DC distribution bus, which are cascade connected;
wherein the controller is operable to control the first DC-to-DC converter in open loop; and
wherein the controller is operable to control a power gain of the converter unit with the second DC-to-DC converter.

* * * * *